July 9, 1968 G. M. BOOSALIS 3,391,633
APPARATUS FOR HEATING AND DISPENSING FOOD ARTICLES
Filed Dec. 16, 1966 4 Sheets-Sheet 1
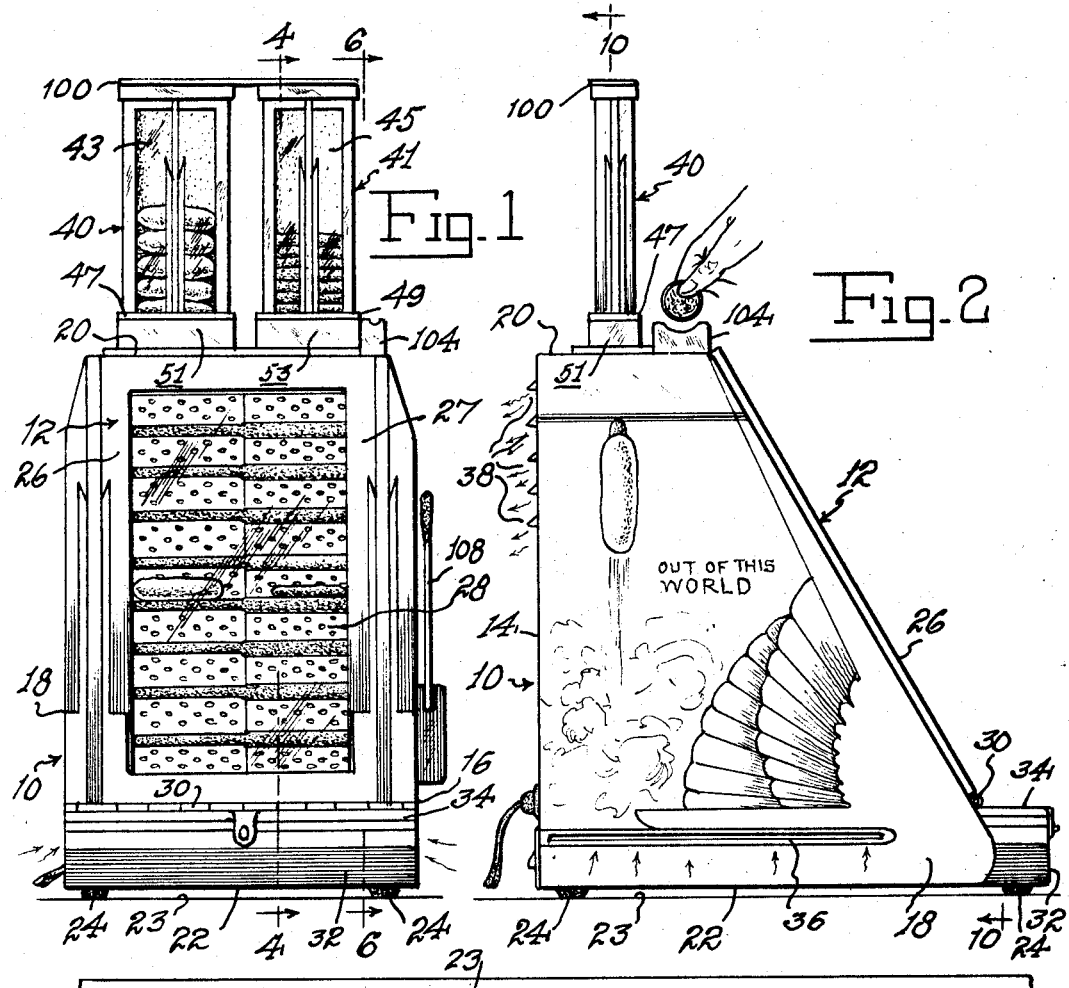
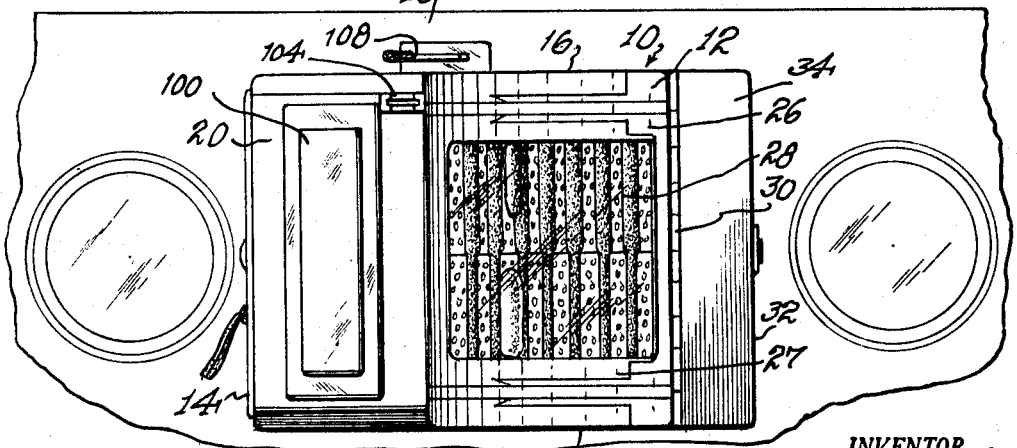
INVENTOR.
George M. Boosalis
BY
Jacob & Davidson
ATTORNEYS

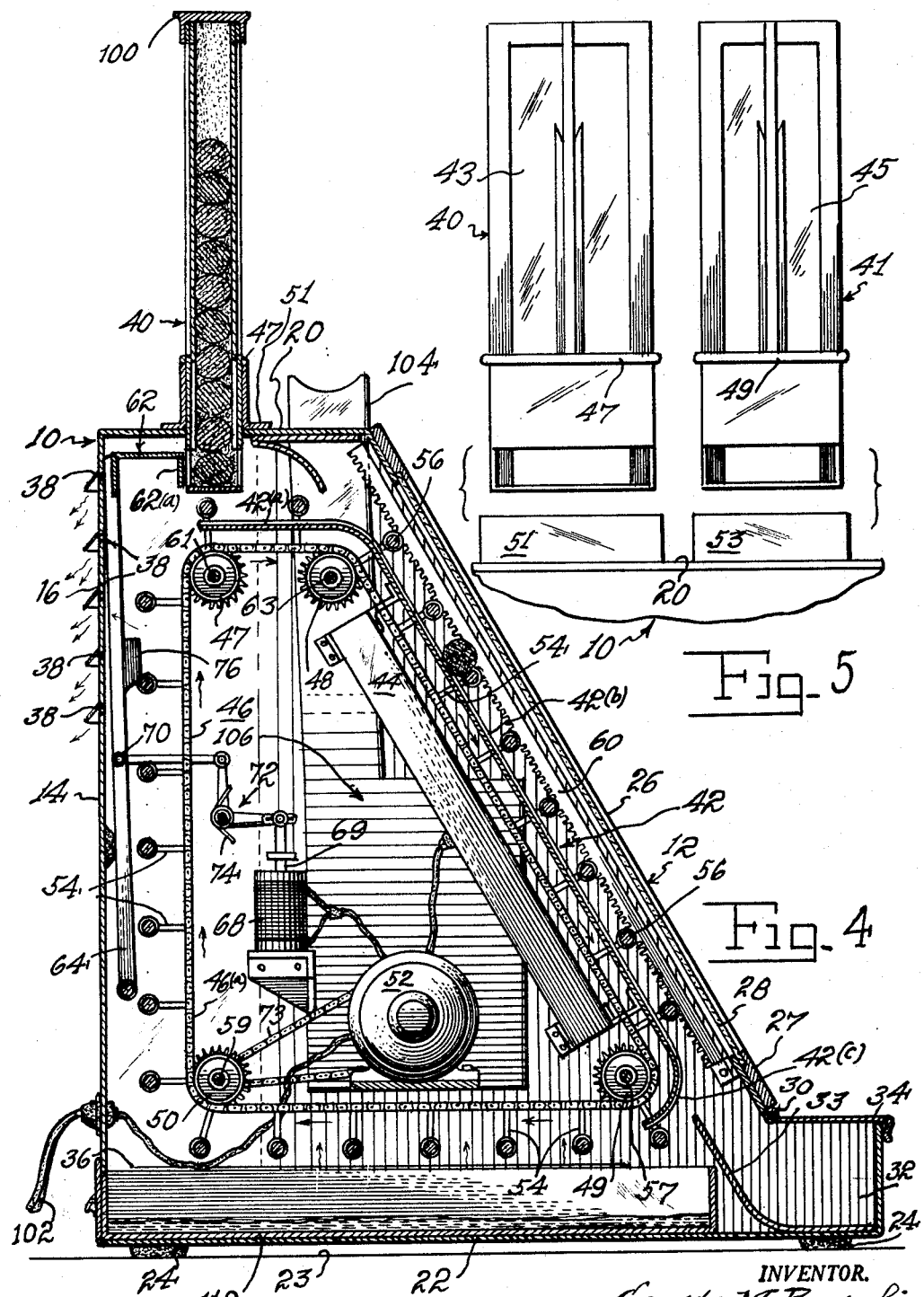

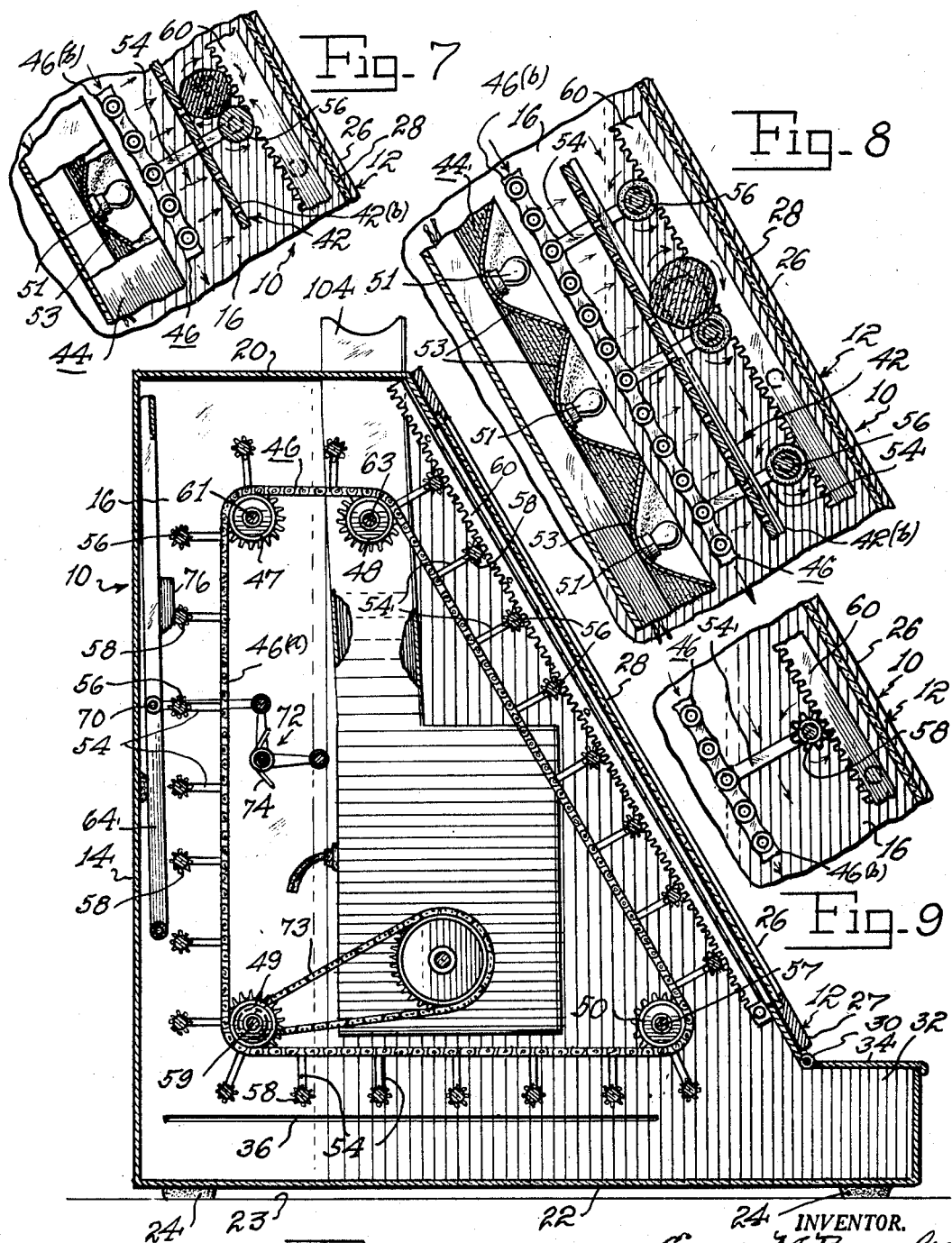

July 9, 1968  G. M. BOOSALIS  3,391,633
APPARATUS FOR HEATING AND DISPENSING FOOD ARTICLES
Filed Dec. 16, 1966  4 Sheets-Sheet 4
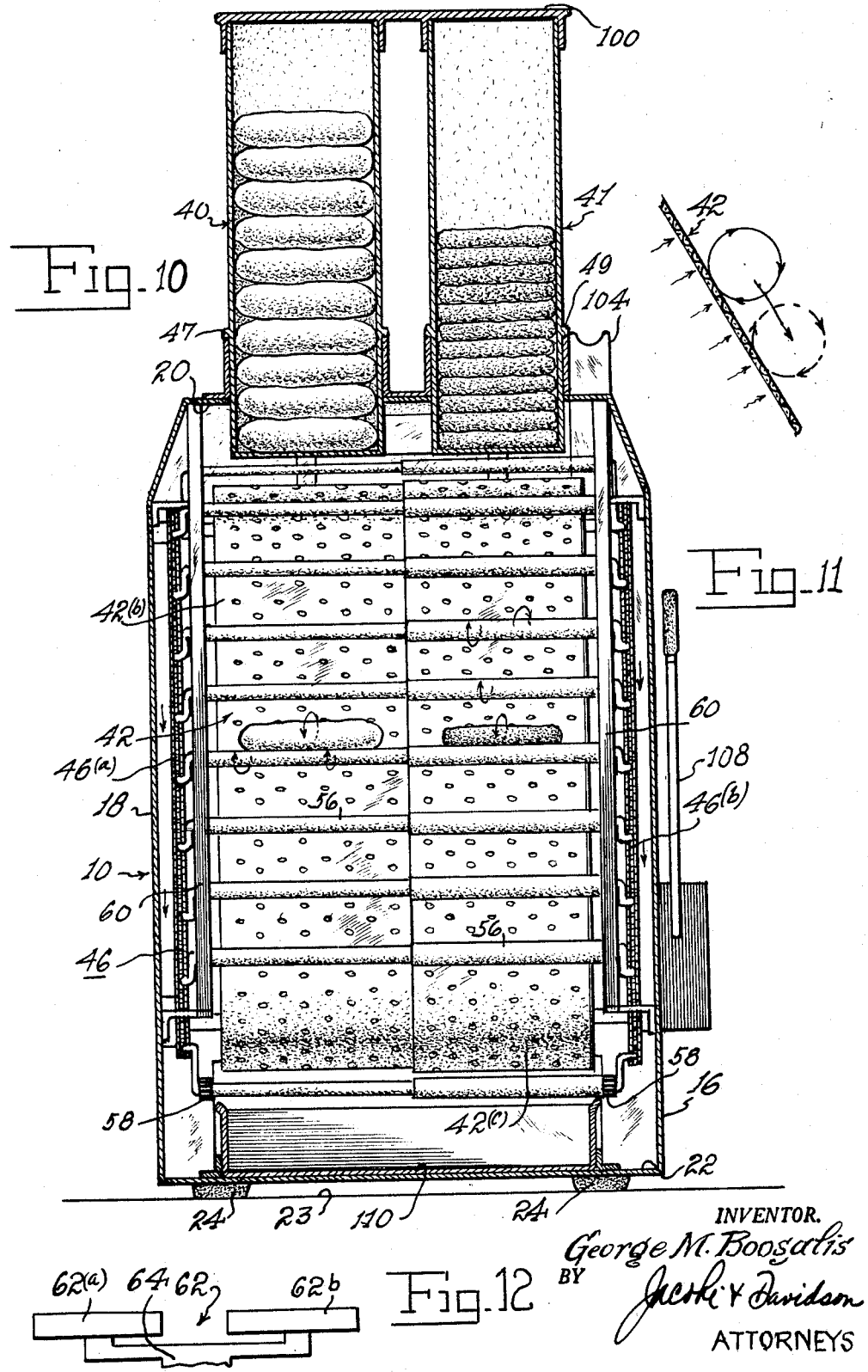
INVENTOR.
George M. Boosalis
BY Jacobi & Davidson
ATTORNEYS

United States Patent Office 3,391,633
Patented July 9, 1968

3,391,633
APPARATUS FOR HEATING AND
DISPENSING FOOD ARTICLES
George M. Boosalis, Cocoa Beach, Fla., assignor of eighty
percent to Mike Boosalis, Fayetteville, N.C.
Filed Dec. 16, 1966, Ser. No. 602,367
10 Claims. (Cl. 99—357)

This invention relates to the preparation and dispensing of food and more specifically to the heating and dispensing of different but complementary articles of food.

The concept of automatically heating and dispensing cylindrical-shaped food articles such as hot dogs and buns is well-known and a variety of devices have heretofore been suggested for such purpose. The prior devices generally either join different but complementary articles of cylindrically-shaped food and successively grill a plurality of such articles in united form or, alternatively, successively cook a plurality of cylindrical-shaped food articles of one type by closely passing them over a cooking element, and at the same time separately warm the complementary article by passing the same through a warming channel remote from the cooking element. While such prior devices served to achieve some desired results, they all possessed inherent drawbacks.

For example, the prior rotatable spit-type devices pierce the hot dog and allow the desirable and tasty juices contained therein to escape.

The continuous cooking, demand dispensing type of prior hot dog dispensers tend to cook and dry out the articles of food processed therein.

The devices that grill two different but complementary articles of cylindrically-shaped food in united form tend to over-heat, dry out, scorch and make crisp and brittle one side of the united articles of food and undesirably tend to leave the opposite side in raw condition. The prior type device which successively passes a plurality of cylindrical-shaped food articles of one type closely over a cooking element while warming the different but complementary food articles in a section of the device partially remote from the cooking element causes some problem because of the inherent tendency of the articles to fall out of proper alignment, bunch together and cook unevenly. Also, the plurality of different but complementary articles disposed partially remote from the cooking element are continuously exposed on one side to the warming heat of the device and this side tends to quickly dry out and become brittle.

In a vast majority of such food preparing devices, an operator must constantly be in attendance to manipulate the machine.

Another drawback of many of the prior "hot dog cooking dispensers" is that they permit or require the operator to place his hand, at frequent intervals, directly into the hot cooking area to manipulate and arrange the articles of food in the device.

Accordingly, one of the principal objects of the present invention is to provide a heating or cooking and dispensing device for cylindrical food articles, which device allows the desirable and tasty juices to be retained in the food articles, which device will not permit or require an operator to place a hand in the cooking area and which device evenly and controllably cooks and automatically dispenses complementary food articles.

More specific and still further objects of the present invention are to provide a device that will (a) heat and dispense different but complementary food articles of a generally cylindrical-shape, (b) store a plurality of each type of food article at a location remote from and unaffected by the heat from the heating section of the device, (c) controllably simultaneously successively pass in spaced apart relation, a plurality of each separate type of food article into proximity with and away from the heating section of the device whereby each article of food is freshly and properly heated, and (d) dispense the same into a pick-up receptacle remote from the heating section.

The invention resides in the combination, construction, and methods of operation of the heating and dispensing device provided hereby, and will be better understood when consideration is given to the following detailed description thereof. The description refers to the annexed drawings presenting the preferred and illustrative embodiments of the invention, and wherein:

FIGURE 1 is a front elevational view of an automatic food article cooking and dispensing device constructed in accordance with the present invention;

FIGURE 2 is a side elevational view of the device presented in FIGURE 1;

FIGURE 3 is a top plan view of the device shown in FIGURES 1 and 2 when the same is operating upon two different but complementary food articles of generally cylindrical shape;

FIGURE 4 is an enlarged vertical sectional view taken on line 4—4 of FIGURE 1 and presenting in some detail the preferred construction and relationship between the operating means and expedients;

FIGURE 5 is a fragmental front elevational view of the magazine or storage section of the apparatus of FIGURE 1;

FIGURE 6 is an enlarged vertical sectional view taken on line 6—6 of FIGURE 1 and presents in some detail the preferred arrangement of the article conveying means provided in the apparatus of FIGURE 1;

FIGURES 7, 8 and 9 are fragmental sectional views of the heating or cooking section of the apparatus shown in FIGURE 1, and present respectively the detailed construction thereof when a hot dog is being conveyed through such section, the detailed construction thereof when a bun is being conveyed through such section, and the detailed coacting relationship between article turning rolls, gear elements coupled thereto and cooperating therewith, and the main conveyor;

FIGURE 10 is an enlarged sectional view taken on line 10—10 of FIGURE 2 and presenting in some detail the conveying and article supporting means of the apparatus;

FIGURE 11 is a fragmental detailed sectional view of a modified form of article supporting platform which may be utilized in the apparatus of the invention; and FIGURE 12 is a fragmental detailed front elevational view of the preferred form of dispensing pusher incorporated in the apparatus of the invention for causing release of articles from the food storing magazines.

The article heating and dispensing device provided by this invention comprises a combination of devices and means which function to attain the objects set forth above, as well as other objects which will become apparent to those of ordinary skill in the art. While the devices and means coact in operation, the same are discussed generally individually under separate sub-headings below for purposes of clarity.

The housing

If specific reference is now made to the drawings, it will be noted that the numeral 10 generally designates the housing of the cooking or heating and dispensing device provided by the present invention. The housing 10 may be of any suitable configuration, but according to the preferred embodiment, the housing 10 is provided with a front wall 12 that is inclined rearwardly from the vertical as best illustrated in FIGURE 2. Also housing 10 comprises a vertical rear wall 14, vertical side walls 16 and 18, a horizontal top wall 20 and a horizontal bottom wall or base 22 that is supported in spaced relation to a support surface 23, such as a table (not shown) by supports 24. The major portion of front wall 12 of the housing 10 preferably takes the form of a door 26 comprising a frame 27 and a transparent section 28, preferably glass or clear plastic, encased by the frame 27. The door 26 may be of the slide-off type, however, as shown, it is hingedly secured to the housing at the base thereof by a suitable hinge 30 (see e.g. FIGURES 1, 2, 3, 4 and 6). Disposed below the front wall 12 and extending forwardly thereof, is a receptacle or bin 32 which, as explained in more detail below, serves to receive cooked items which have been processed through the apparatus. The bin 32 preferably has a lid 34 hingedly secured to the front wall frame 27 by common hinge 30 to which reference was previously made.

In order to provide for the circulation of air within the housing 10, the side walls 16 and 18 thereof are provided with horizontal air vents 36 disposed in the lower portions thereof and communicating with the interior of the housing 10, as shown in FIGURE 2. Additional air vents 38 are disposed in the upper portion of the rear wall 14 of the housing. These additional vents serve to permit rising hot air to escape from the housing.

*The food article storing means*

The food items to be processed through the apparatus are stored in magazines 40 and 41 which detachably extend vertically above the top wall 20 of the housing 10 and which have their bottom end portions communicating with the upper interior of the housing, as explained in more detail below. The forward and rear walls of the magazines 40 and 41 are open at their respective lower end portions, as shown in FIGURE 4, and are spaced apart so as to support a plurality of food articles, of a generally cylindrical-shape, in stacked relation. Magazine 40 contains hot dog buns or rolls as shown, and magazine 41 contains hot dogs as shown. However, it should be understood that any different but complementary food articles may be processed by the apparatus without departing from the scope and spirit of the invention. The side by side magazines 40 and 41 comprise elongated parallelogram box-like structures which are preferably provided with transparent front panels 43 and 45, and a horizontal projecting band or flange 47 and 49. These bands or flanges cooperate with the walls of sleeve brackets 51 and 53 (FIGURES 4 and 5) which are fixed to the top wall 20 of housing 10. More specifically, the sleeve brackets 51 and 53 are adapted to receive respectively magazines 40 and 41, and when the magazines are in operating position within the sleeve brackets (FIGURE 4), the bands 47 and 49 rest on the top edges of the sleeve walls thereby maintaining the magazines in proper vertical position with the lower ends thereof within the housing whereby as explained below, the food articles can be dispensed onto the apparatus conveying means.

*Article processing assembly*

Supported within the housing 10 and having an upper end disposed below but adjacent the magazines is an article supporting platform 42. The major portion 42(b) of the supporting platform, or article receiving surface thereof, is vertically inclined in a plane substantially parallel to the front wall 12 of the housing 10. The upper end portion 42(a) of the platform 42 is disposed in a horizontal plane parallel to that of the housing top wall 20 and terminates in parallel spaced relation to and below the bottom end of the magazines 40 and 41, as best shown in FIGURE 4. The lower end portion of the platform 42 is curved inwardly and terminates in spaced relation to a bin chute 33 which directs articles into receptacle or bin 32.

The platform 42 is disposed above an article heating means 44 which serves to direct radiation onto the articles traveling through the apparatus over the article supporting platform. The inclined article supporting platform 42 is rigidly secured to, and supported by, the heating means 44 which, in turn, is secured to and supported by the side walls 16 and 18 of the housing 10 by welding, or any other suitable means desired. The platform may be of various types, but the preferred embodiment provides for forming the same as a foraminous plate, as shown in FIGURES 1, 3, 7, 8 and 10. A modification of the invention provides for forming the platform from screen, as shown in FIGURE 11.

The heating means 44 to which reference was made above, is disposed within the housing 10 in spaced parallel relation to the major portion 42(b) of the platform 42. Preferably, the heating means comprises an array of electrical radiant energy elements directed towards the bottom surface of the platform 42, as best shown in FIGURE 8. This array consists of a series of infra-red lamps 51 located centrally of each reflector in the series of parabolic reflectors 53 provided in the heating means as shown in FIGURES 7 and 8. An endless conveyor means 46 is disposed within housing 10 and the conveyor thereof passes between the platform 42 and heating means 44. The conveyor means 46, in its preferred form, is comprised of two endless belts 46(a) and 46(b) of the chain link-type which pass on opposite sides of platform 42 as shown in FIGURE 10. The belts are identical, as are the sprockets supporting the same and thus only one chain and the sprocket supports therefor will be described.

Spaced sprocket wheels or gears 47, 48, 49 and 50 are disposed so that the conveyor chains travel parallel to the front, back, top and side walls of the housing 10. The sprocket gears are supported on shafts 57, 59, 61 and 63 which extend between opposite side walls of the housing in spaced relation to the front, back, top and bottom walls thereof. Each shaft carries two sprockets, one for chain belt 46(a) and one for chain belt 46(b), but only one sprocket is shown on each shaft since cooperation between the other sprocket and other chain belt should be apparent.

With such disposition of the sprockets and sprocket shafts as described and shown, the conveyor belts 46(a) and 46(b) travel beyond the edges of the platform 42 and in spaced parallel relation to and below the entire length thereof.

Also disposed within the housing 10 is a drive means for the conveyor belts 46(a) and 46(b) which drive means preferably comprises electric motor 52, and a drive chain 73 which extends between a motor sprocket (not shown) and a sprocket (not shown) carried by shaft 59. With this well-known type drive, the motor 52 is operatively associated with the conveyor means 46 and adapted to actuate the same.

Extending from each edge of the conveyor means 46 are a plurality of supporting arms 54 which serve to support rollers adapted to rotate food articles being processed as the articles travel through the apparatus. The supporting arms 54 extend above the supporting surface of the platform 42 at the side edges thereof when such arms are adjacent the article supporting platform. Rotatably secured between aligned supporting arms 54 extending from one side edge of the conveyor, and corresponding supporting arms 54 extending from the other side of the conveyor are the article turning rollers 56. The rollers 56 extend across the supporting surface of the platform 42 in spaced relation thereto, as shown in FIGURES 1, 3, 4, 6, 7, 8 and 10. Preferably, one side of the rollers 56 have a different diameter than the other side thereof, i.e. preferably the rollers are of different diameters on opposite sides of their longitudinal center, as best shown in FIGURES 1, 3 and 10.

Fixedly secured on one end of each of the rollers 56 is a gear wheel or pinion 58, as shown in FIGURES 6 and 9. Disposed in parallel spaced relation to the major portion of the platform 42 is a rack gear 60 that engages and rotates the gear wheels 58 as they pass along the major portion of the platform 42. The cooperation between gear wheels 58 and rack gear 60 causes rotation of the rollers 56, and rotation of rollers 56 controllably positively causes rotation of any articles of food in contact with the rollers, and being conveyed thereby over and along the supporting surface of the platform 42. Such positive control in the rotation of the food articles as they pass along and over the supporting surface of the platform 42 and are being subjected to cooking heat from heating means 44, will insure proper and even heating and cooking. The diameters of the rollers serve to provide for proper rotational speed during cooking as well as proper frictional engagement between the rollers and articles being processed.

*The article ejecting means*

Associated with the lower end portions of the food article magazines 40 and 41 is a horizontally disposed food article dispensing pusher means 62 that is adapted to simultaneously pushably dispense one food article from each of the magazines 40 and 41 at each actuation. To accomplish this, the pusher means comprises a pusher arm 62 fixed to the upper end, and extending laterally of a vertical lever 64. The lever 64 is pivotally secured at its lower end about a shaft 66 extending between the sides of the housing 10.

The forward end (left end as shown in FIGURES 4 and 6) of pusher arm 62 comprises two spaced apart pusher arm heads 62(a) and 62(b) which are adapted to enter the rear bottom openings in magazines 40 and 41 respectively thereby pushing one article through the front bottom opening in each magazine. The top face of each pusher arm serves to support the next stacked article in its initial position so that the next article does not drop into the dispensing bottom position until the pusher arm head returns to its original position after dispensing an article.

Pusher actuating means, which preferably takes the form of an electric solenoid 68, is operatively secured to the lever 64, as at 70, by means of a conventional linkage 72. The linkage incorporates a spring 74 for normally urging the link arms to the position shown in FIGURE 6, but when the solenoid 68 is energized, and the plunger 69 thereof is pulled downwardly, the lever 64 is through linkage 72, pulled to the right, and the dispensing pusher heads 62(a) and 62(b) move forwardly or to the right to pushably dispense the complementary articles.

In order to achieve uniform heating and/or cooking of food articles being processed through the apparatus, it is desirable to have only one food article disposed on each side of the apparatus between two adjacent rollers 56. Accordingly, a cam lobe 76 is disposed on the forward (right, as shown in FIGURES 4 and 6) surface of the lever 64. This cam lobe successively engages each of the rollers 56 as they move upwardly parallel with the rear wall 14 of the housing 10 whereby the actuating solenoid means 68 is intermittently overriden so as to allow only one actuation of the lever 64 and pusher 62 within the time it takes the conveyors to move successive rollers past the article receiving position immediately under and forward of the bottom of magazines 40 and 41, i.e., the pusher arm can only cause dispensing of one article of each type between two adjacent rollers because the cam lobe 76 prevents the pusher arm from moving forwardly twice during the time that the space between adjacent rollers is in position to receive articles.

*Operation*

Having set forth above the general assembly provided by the invention, and cooperation between the components and means thereof, attention can now be directed to the manner in which the apparatus is prepared for operation, and the manner in which the apparatus operates to dispense cooked and/or heated complementary food articles processed therethrough.

Initially, the apparatus is prepared for use by filling the magazines 40 and 41 with hot dogs and hot dog buns respectively. This is accomplished by removing the common lid member 100 (FIGURE 10) from the magazines, and by inserting the differing articles in the respective magazines in stacked relation. Of course, since the magazines are detachably held or supported in the apparatus as explained above, the magazines may be prefilled at a factory, if desired. In such event, the magazines would merely be placed in their operative position as shown in the annexed drawings, and then the lid member 100 would be applied.

The only additional step which must be performed initially is that of connecting the cord 102 (FIGURE 4) with a suitable electrical outlet so that power is supplied for operation of the conveyor drive motor 52 and for operation of the pusher actuating solenoid 68.

After the foregoing steps have been performed, then the apparatus is ready for automatic operation. A user, desiring a hot dog sandwich, would insert a coin of appropriate denomination within the coin slot 104, and this slot would lead the coin into the coin actuated energizing means 106. Coin actuated energizing means of various types are well-known, and the apparatus of the present invention incorporates any desired available type. The coin actuated energizing means may itself automatically cause energization of the solenoid 68, or alternatively, if the coin energizing means is of the type requiring handle operation, then it is necessary to pull a suitable handle, such as that designated by numeral 108, in order to cause activation of the solenoid 68 in response to depositing a coin into the slot 104 of the coin actuated energizing means 106.

Once the coin has been deposited, and the solenoid has been activated, then the plunger 69 of the solenoid is pulled downwardly, and the linkage 72 coupled with the plunger 69 serves to move the lever 64 to the right causing the pusher arm 62 carried at the top of the lever 64 to move through the magazines 40 and 41. More particularly, the heads 62(a) and 62(b) of the pusher arm 62 move through the magazines 40 and 41 respectively thereby pushing one hot dog bun and one hot dog from each of the magazines. The hot dog and hot dog bun so pushed fall onto the upper end 42(a) of the article supporting platform between two adjacent rollers 56. The hot dog is dispensed on the right-side of the apparatus (FIGURE 10) and the hot dog bun is dispensed on the left-side of the apparatus. The hot dog thus engages the larger portion of the lowermost of the rollers between which it is disposed and the hot dog bun engages the smaller portion of the lowermost of the rollers between which it is disposed. After the hot dog and hot dog bun have dropped onto the article supporting platform the conveyor moves the same to the right (FIGURE 4) and the hot dog and hot dog bun begin to descend along the portion 42(b) of the platform means which is inclined. It is during this descent initially that the bun and hot dog move into positive engagement with the lowermost of the rollers between which they are disposed.

The hot dog and the hot dog bun rest adjacent the platform 42 during the descent because of the action of gravity, and they are rotated during the descent by virtue of the rotation of the roller with which they are in engagement. Of course, the bun and hot dog rest loosely against the platform and receive therethrough the heat radiated from the lamps 51 and directed through the platform by the parabolic reflector 53. If desired, the amount of radiation directed onto the left-side of the platform over which the hot dog bun is traveling may be less than the radiation directed onto the right-side of the platform over which the hot dog is traveling so as to insure proper and uniform heating of both articles.

After the hot dog and hot dog bun have traversed the inclined portion 42(b) of the platform 42, they reach the lower curved end 42(c) thereof, and at this point drop under the action of gravity, on the receptacle or bin chute 33. The chute directs the articles into the bin 32, and the person who is using the machine recovers the cooked hot dog and warmed bun from the bin 32 by opening the lid 34 thereof.

Since the processing of the hot dogs causes some disposition of grease on the rollers and within the apparatus, there is provided in the bottom of the housing 10 a grease receptacle or tray 110. This receptacle collects the normal grease which drips from the rollers and the platform, but in order to clean the apparatus thoroughly, it is only necessary to open the front wall 12 thereof by pivoting the same about the hinge 30. This permits ready access to the rollers and the platform for cleaning purposes, and moreover allows for replacement of the radiant energy lamps, in the event the same should burn out.

As explained above, the housing is provided with suitable openings in the lower portions of the sidewalls and the upper portions of the back wall whereby heat generated within the apparatus may escape through the openings in the back wall by virtue of the circulation through the apparatus of air entering the lower part of the sidewalls.

It will be appreciated that while the operation has been explained in connection with only one hot dog and only one bun, the apparatus can operate continuously with a hot dog and a bun between each pair of adjacent rollers. However, the cam lobe 76 serves to prevent having more than one hot dog and more than one bun between any pair of adjacent rollers.

Although specific reference has not been made hereinabove to the detailed manner in which the support arms 54 are coupled with the conveyor, it will be understood that they may be welded thereto, or otherwise suitably attached without departing from the scope and spirit of the invention. Similarly, other components which are supported within the apparatus may be coupled to associated components or the housing by means of welding, screws, or the like. The details of connecting and supporting particular elements are not important, but the manner in which the elements are supported in relation to the other elements, and the manner in which the elements coact are the significant factors.

Conclusion

After reading the foregoing detailed description of the illustrative and preferred embodiments of the present invention, it should be apparent that the objects set forth at the outset of this specification have been successfully achieved. After reading this specification, various modifications other than those specifically suggested above may become apparent to those of ordinary skill in the art. Accordingly,

What is claimed is:

1. Apparatus for heating and dispensing longitudinally elongated discrete food articles, said apparatus comprising:

housing means including a discharge opening means;

magazine means coupled with said housing means and adapted to store said food articles in stacked relation;

conveyor means disposed within said housing and extending between said magazine means and said discharge opening means;

heating means juxtaposed to said conveyor means to heat food articles being transferred by said conveyor means;

dispensing means cooperatively associated with said magazine means and actuatable to dispense one of said food articles from the stack in said magazine means and onto said conveyor means;

driving means for operating said conveyor means to transfer a food article from said magazine means to said discharge opening means;

said conveyor means including a plurality of spaced apart members, with a food article normally abutting against one of said members during said transfer; and actuating means coupled with said dispensing means to actuate said dispensing means and thereby dispense a food article from said magazine means between adjacent members on said conveyor means;

said dispensing means including a portion engageable with each successive member to prevent more than one article from being dispensed from said magazine means in the space between any pair of members.

2. Apparatus as defined in claim 1 further including a perforated article supporting platform juxtaposed to said conveyor means whereby each article being transferred rests thereupon while abutting against one of said members.

3. Apparatus as defined in claim 2 wherein said members are rotatably mounted to cause each of said articles to rotate about its own longitudinal axis during transfer.

4. Apparatus as defined in claim 3 wherein each of said rotatably mounted members carries a gear means and wherein said housing includes a stationary drive rack whereby as said driving means operates said conveyor means, said gear means engage with said drive rack to rotate said members.

5. Apparatus as defined in claim 2 wherein said heating means and said articles being transferred are disposed on opposite sides of said platform whereupon the heat from said heating means is transferred through said platform to said articles.

6. Apparatus as defined in claim 1 wherein said dispensing means includes an elongated arm having opposed ends, one of which is pivotally attached to said housing and the other of which carries a pusher arm operable upon each actuation of said dispensing means to push an article from said magazine means onto said conveyor means.

7. Apparatus as defined in claim 6 wherein said portion of said dispensing means is at least partially a cam lobe.

8. Apparatus as defined in claim 6 wherein said actuating means is a solenoid and wherein linkage means couples said solenoid with said elongated lever.

9. Apparatus as defined in claim 1 wherein said magazine means includes two separate casings and wherein said dispensing means includes pusher arm means having two head portions, one of said head portions being movable through one of said casings and the other of said head portions being movable through the other of said casings to effect dispensing.

10. Apparatus as defined in claim 9 wherein said casings each carry differently sized food articles and wherein said members on said conveyor means comprise rollers, said rollers each having one half thereof with a diameter different from the other half thereof to thus accommodate said differently sized food articles.

References Cited

UNITED STATES PATENTS

| | | | |
|---|---|---|---|
| 1,716,266 | 6/1929 | Flamm | 99—357 XR |
| 1,776,501 | 9/1930 | Grady. | |
| 2,244,670 | 6/1941 | Benedict. | |
| 2,337,117 | 12/1943 | Lloyd | 99—387 XR |
| 2,501,712 | 3/1950 | Chodziesner | 99—357 |
| 2,602,392 | 7/1952 | Panken. | |
| 2,950,024 | 8/1960 | Adler. | |
| 3,160,255 | 12/1964 | Ferraro et al. | |
| 3,233,536 | 2/1966 | Ignelzi | 99—357 |
| 3,340,790 | 9/1967 | Simjian | 99—387 XR |

BILLY J. WILHITE, *Primary Examiner.*